Jan. 10, 1961

G. A. REED 2,967,809

METHOD AND APPARATUS FOR CONTROLLING
DIRECT-CYCLE NEUTRONIC REACTORS

Filed Aug. 13, 1957

INVENTOR.
Glenn A. Reed
BY
Roland A. Anderson
Attorney

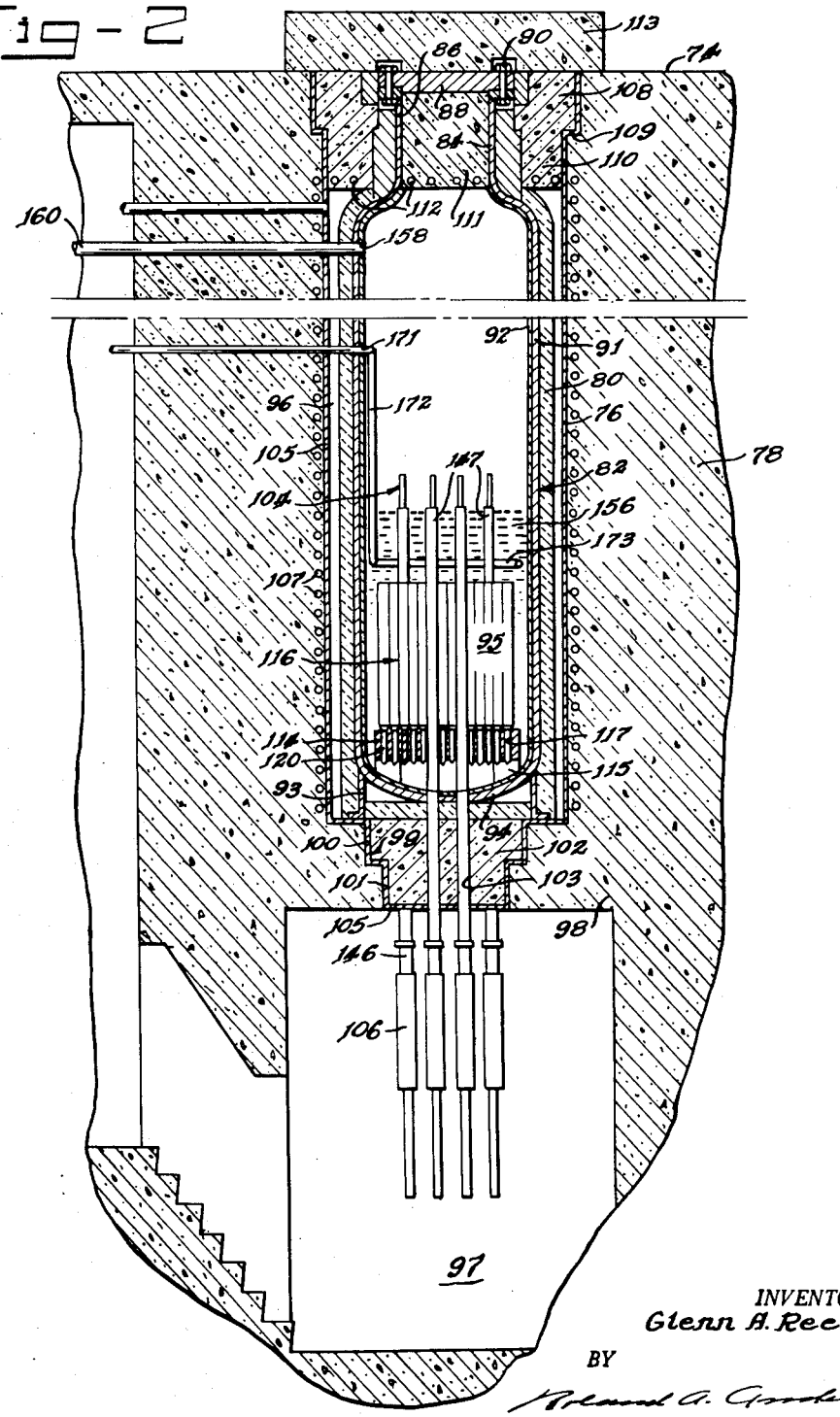

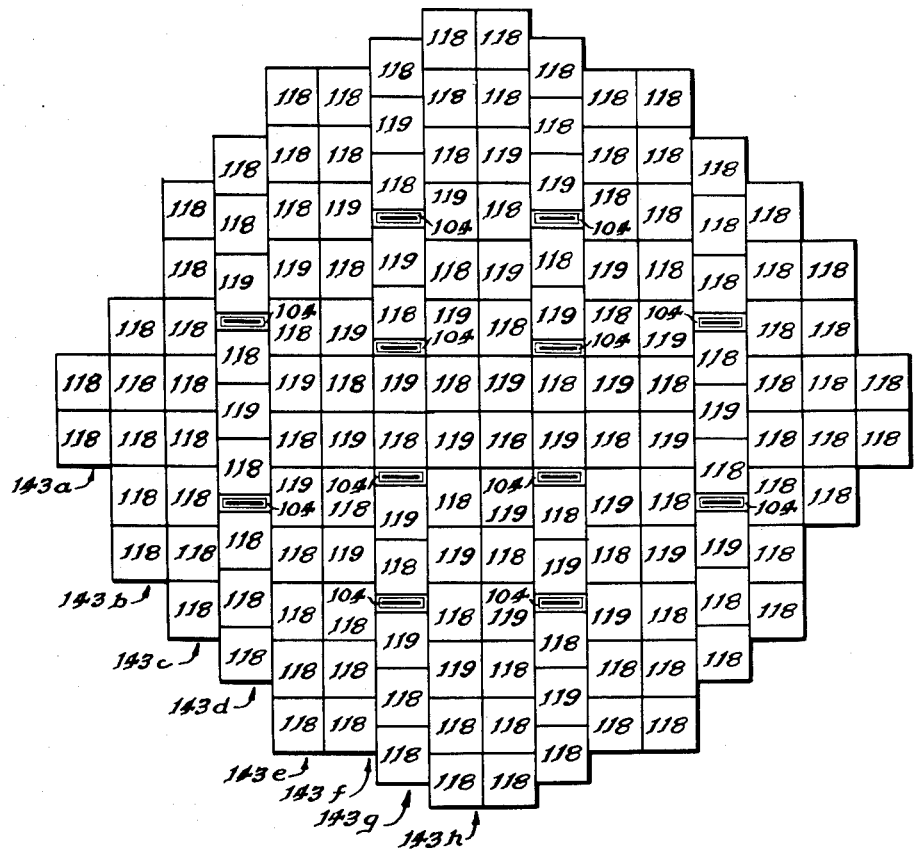

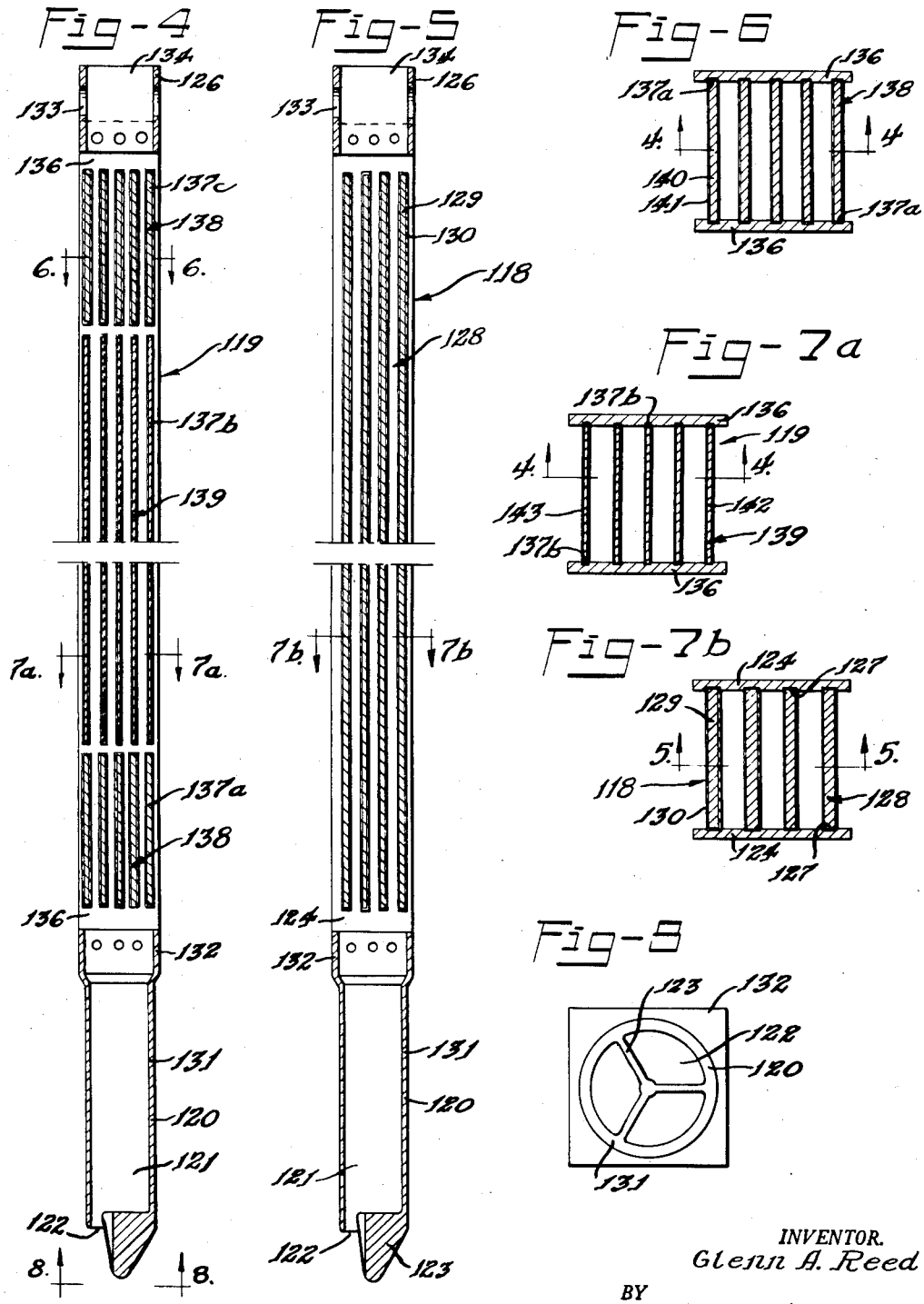

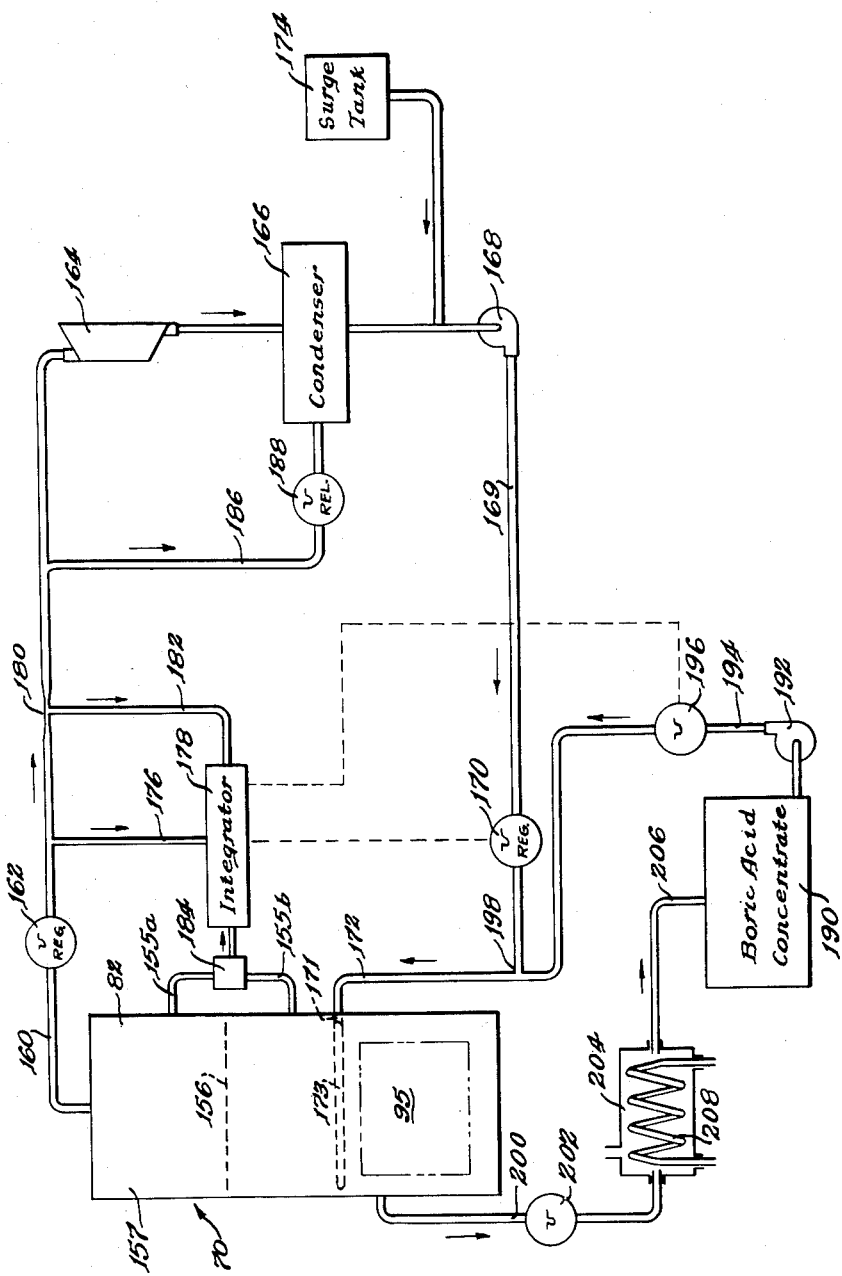

United States Patent Office

2,967,809
Patented Jan. 10, 1961

2,967,809

METHOD AND APPARATUS FOR CONTROLLING DIRECT-CYCLE NEUTRONIC REACTORS

Glenn A. Reed, East Natick, Mass., assignor to the United States of America as represented by the United States Atomic Energy Commission Filed Aug. 13, 1957, Ser. No. 678,252

1 Claim. (Cl. 204—154.2)

The present invention relates in general to neutronic reactors and in particular to apparatus and a method for controlling reactivity in direct-cycle boiling reactors.

A direct-cycle boiling reactor is one in which a coolant, usually water, is passed in heat exchange relationship with the active portion thereof, and the water is thereby partly converted into steam which is utilized directly to energize a turbogenerator to generate electrical power.

It will be apparent that the word "water" as used throughout the specification and claims is intended to include both light and heavy water.

Heat is removed from one of the reactors known to the art by a liquid coolant passed through the active portion of the reactor under pressure. Useful power is then obtained from coolant flashed into vapor exterior to the active portion of the reactor. The aforementioned reactor is described in a patent application, Serial No. 628,320, filed November 13, 1945, by Harcourt C. Vernon, now Patent No. 2,825,688. Another type of boiling reactor is described in a patent application, Serial No. 518,427, filed June 28, 1955, now Patent No. 2,936,273, issued May 10, 1960, by Samuel Untermyer.

The control method and system according to the present invention may be used instead of or in conjunction with conventional methods of control. The usual method of controlling reactivity in a boiling reactor comprises insertion and withdrawal of control members into and out of the active portion of the reactor. The control members are usually constructed of material having a substantial neutron-capture cross-section. One of the disadvantages arising from the use of such control members is the nonuniform distribution of neutron flux in the reactor resulting in uneven heat distribution. Furthermore, the use of control members complicates the structure of the reactor because the housings containing the control members have to penetrate through the active portion and the pressure vessel encompassing said active portion. By the use of the present invention control rods may be completely eliminated or they may be employed as safety devices only with operating control being supplied as described hereinbelow.

An object of this invention is to provide a method for controlling reactivity in a neutronic reactor.

A more specific object of the present invention is to provide a method of controlling reactivity in a neutronic reactor containing a uniform amount of a neutron-absorbing material in a coolant by varying the amount of coolant.

Another object of the invention is to provide a method of controlling reactivity in a neutronic reactor by simultaneously varying the amount of a coolant in the reactor and by varying the amount of neutron-absorbing material dispersed in the coolant.

A further object of the invention is to provide a neutronic reactor controlled by a uniform amount of neutron-absorbing material in a varying amount of coolant.

In accordance with the teachings of this invention, there is provided a method for controlling neutron flux in a boiling reactor by varying the concentration of neutron-absorbing material in water in heat exchange contact with the active portion of the reactor. Control is obtained by regulating the rate of flow of the feed water returning to the reactor which regulation is effective to vary the concentration of neutron-absorbing material within the reactor. Additional control may be achieved by varying the amount of neutron-absorbing material injected into the feed water.

The apparatus for carrying out the method described above is a neutronic reactor which comprises an active portion containing a core having a mass of neutron-fissionable material in an amount sufficient to support a neutron chain reaction, said active portion being contained in a pressure vessel having therein a mass of water adapted to remove heat generated by fission within the core. The steam output of the reactor is connected to a turbogenerator and thereafter, the exhausted steam is condensed by a condenser and then returned back as feed water to the pressure vessel. Means are provided for varying the neutron flux in the active portion by controlling the concentration of neutron-absorbing material dispersed in the coolant; this is achieved by varying the amount of feed water returned to the reactor vessel. Additional means are provided for varying the amount of neutron-absorbing material fed into the feed water returning to the vessel.

The present invention will be more fully understood from a further reading of the present specification, particularly when viewed in the light of the drawings, in which:

Figure 2 is a vertical sectional view of the reactor illustrated in Figure 1;

Figure 3 is a somewhat schematic plan view of the core of the reactor illustrated in Figure 2;

Figure 4 is a vertical sectional view of one of the fuel elements for the reactor illustrated in Figures 1 through 3;

Figure 5 is a vertical sectional view of a second type of fuel element used in the reactor illustrated in Figures 1 through 3;

Figure 6 is a sectional view taken along the line 6—6 of Figure 4;

Figure 7a is a sectional view taken along the line 7a—7a of Figure 4;

Figure 7b is a sectional view taken along the line 7b—7b of Figure 5;

Figure 8 is an elevational view from the line 8—8 of Figure 4;

Figure 11 is a flow diagram showing a steam circuit for the reactor connected to power generating equipment;

Figure 12:
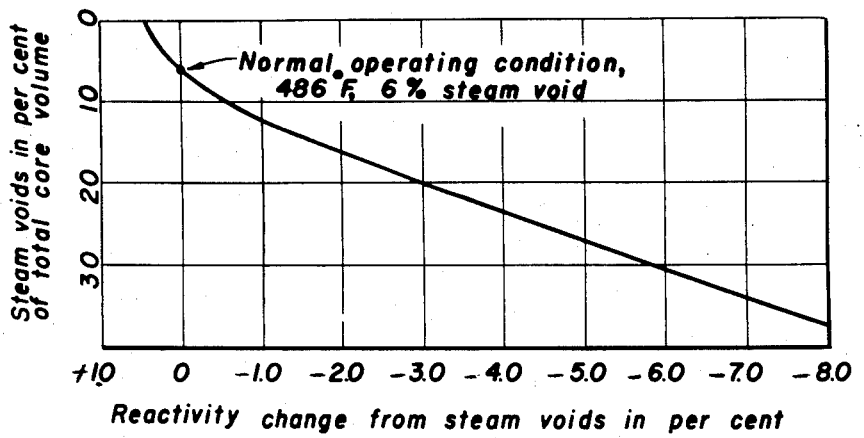
Figure 13:
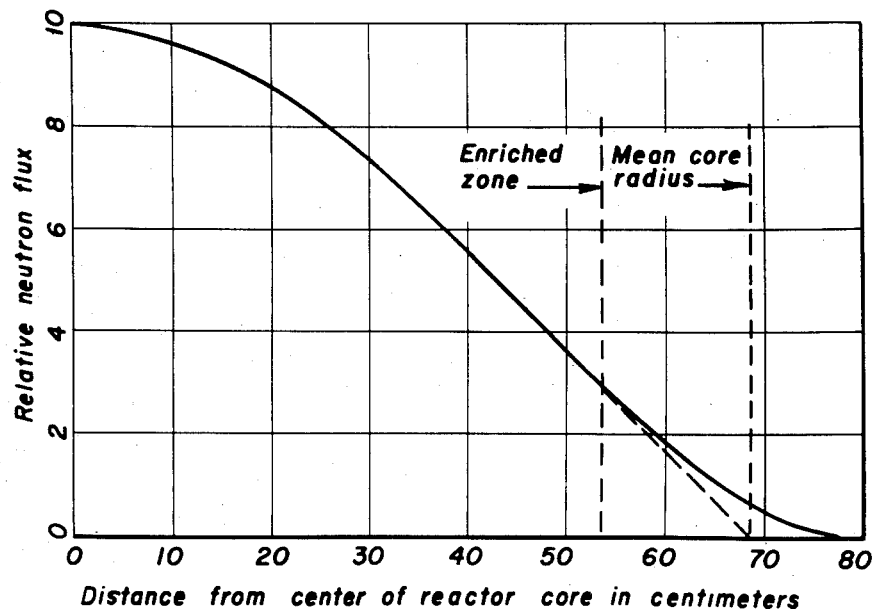

Figure 12 is a graph showing the relation of the ratio of the volume of steam in the reactor core to the total core volume relative to the reactivity of the reactor in percent of the neutron reproduction ratio, $k_{eff}$, at criticality; and Fig. 13 is a graph illustrating the thermal neutron flux pattern as it appears horizontally through the center of the reactor core, the relative neutron flux being plotted along the ordinate in percent, and the distance from the center of the reactor core in centimeters being plotted along the abscissa.

The reactor illustrated in Figures 1 through 13 is a water-cooled, water-moderated reactor. The reactor 70 is disposed within a building 72 beneath the ground level 74 of the surrounding terrain. The reactor 70 is mounted within a cavity 76 in a concrete supporting structure 78 with a layer of thermal insulation 80 disposed between the reactor 70 and the walls of the cavity 76.

The reactor 70 is provided with a pressure vessel 82 which is cylindrical in shape and disposed vertically within the cavity 76. The pressure vessel 82 is provided with a neck 84 at its upper end with a diameter smaller than that of the pressure vessel 82, and the neck 84 forms an aperture 86 permitting access into the pressure vessel 82. A removable cover 88 is removably secured to the neck 84 of pressure vessel 82 about the periphery of the aperture 86 by spaced bolts 90 extending through the cover 88 and anchored in the neck 84 of the pressure vessel 82. The pressure vessel 82 includes a tank 91 and a stainless steel liner 92 on its inner surface to prevent corrosion of the steel tank 91. The inner diameter of the stainless steel liner 92 is 6 feet throughout the cylindrical portion of the pressure vessel 82, and the inner diameter of the neck portion 84 of the pressure vessel 82 is approximately 3 feet. The pressure vessel 82 rests upon a cylindrical tank support 93 which is secured to the base of the tank 91 and rests upon the concrete supporting structure 78. The base of the tank 91 is in the form of a spherical portion 94 which supports a reactor core 95 within the pressure vessel 82.

The neck 84 of the pressure vessel 82 is approximately 4 feet long, and it takes approximately 1 foot to curve the pressure vessel 82 from its maximum diameter to the diameter of the neck 84. The height of the pressure vessel between the neck and the cylindrical segment base 94 is approximately 25 feet measured along the axis of the pressure vessel 82. The pressure vessel 82 is designed to withstand pressures up to 800 p.s.i., and is intended to be operated at a pressure of 600 p.s.i.

The cavity 76 within which the pressure vessel 82 is mounted is also cylindrical in form with a diameter of approximately 8 feet. The layer of thermal insulation 80 which is attached to the exterior surface of the pressure vessel minimizes the escape of thermal energy from the interior of the pressure vessel. The thermal insulation 80 in the particular construction here described is asbestos and has a thickness of approximately 1 foot. Between the thermal insulation 80 and the bounding surface of the cavity 76 is an air gap 96 which also thermally insulates the pressure vessel 82 from the supporting structure 78.

The supporting structure 78 is also provided with a second cavity 97 directly beneath the first cavity 76, the two cavities being separated by a platform 98 of concrete which is about 3 feet thick. The pressure vessel 82 rests upon the platform 98, and an aperture 99 extends through the platform 98 directly beneath the pressure vessel 82. The aperture 99 has two portions 100 and 101 disposed adjacent to each other, the upper portion 100 having a greater diameter than the lower portion 101 of the aperture. A plug 102 in the form of a stepped cylinder has cylindrical sides conforming to those of the aperture 99 and is disposed within the aperture 99. The plug 102 is provided with a plurality of channels 103 which extend therethrough parallel to the axis of the pressure vessel 82 in order to accommodate movable safety control elements 104.

A secondary steel tank 105 lines the entire cavity 76 and also the walls of the aperture 99. The tank 105 is sealed to a plurality of safety control rod drive mechanisms 106 which extend into the second cavity 97 through the channels 103 in the plug 102. In this manner, any liquid leakage which occurs from the pressure vessel 82 will be retained within the secondary tank 105. Also, the cavity 76 is surrounded by a plurality of coolant tubes 107 embedded in the concrete supporting structure 78 adjacent to the secondary tank 105, and a flow of liquid coolant, namely water, in the particular construction, removes the heat which penetrates to the concrete supporting structure 78 and prevents deterioration of the concrete therein.

The upper end of the cavity 76 (adjacent to the ground level 74) is provided with a cylindrical region 108 with a larger diameter than the rest of the cavity 76 forming a shoulder 109. A cylindrical concrete shield block 110 rests upon the shoulder 109 and conforms in shape to the surface of the region 108. A plug 111 is disposed within the neck 84 of the pressure vessel 82 and attached to the cover 88 thereof. The plug 111 and shield block 110 are constructed of concrete, and are also provided with coolant tubes 112 through which cooling water flows. A removable annular shielding slab 113 rests upon the ground surface 74 and extends over the neck 84 and the annular shield block 110. The slab 113 is constructed of concrete.

The reactor core 95 rests upon an annular core supporting structure 114 which is provided with pedestals 115 which are attached to the base 94 of the pressure vessel 82. The core 95 is formed of a plurality of removable fuel elements 116. Each of the fuel elements 116 is slidably disposed within a channel 117 which extends through the support structure 114 parallel to the axis of the pressure vessel 82. These removable fuel elements 116 contain thermal neutron fissionable material for maintaining the neutron chain reaction and are of two types, 118 and 119. A neutron chain reaction cannot be initiated and sustained with uranium having the isotopic content found in nature disposed within a body of water ($H_2O$). It is for this reason that fuel elements 119 contain fissionable material consisting of uranium having the isotopic content found in nature, and fuel elements 118 contain fissionable material highly enriched in the $U^{235}$ isotope.

As illustrated in Figures 4 and 5, both of the fuel elements 118 and 119 have mounting stems 120 at one end which are removably positioned within channels 117 in the support structure 114. The stems 120 are provided with central channels 121 which communicate with the exterior of the stems 120 through three apertures 122 at one end of the stems 120. The apertures 122 are in the form of segments of a circle formed by fins 123 which also serve to properly orient the fuel elements 116 within the support structure 114.

In the case of the elements 118, a pair of side plates 124 are attached to opposite sides of the stems 120 and extend to a rectangular discharge fitting 126, as illustrated in Figure 7b. The side plates 124 are each provided with four indentations 127, and the indentations of confronting plates confront each other. Four plates 128 having thicknesses approximately equal to that of the indentations are disposed between the side plates 124 and anchored within confronting indentations 127.

The elements 118 have side plates 124 constructed of zirconium approximately ⅛ inch thick and spaced from each other by a distance of 3⅝ inches. The plates 128 are spaced from each other by a distance of approximately ⅝ inch, and the thickness of the plates 128 is approximately ⅜ inch. Each of the plates 128 is 48 inches long and 3¾ inches wide. The plates 128 have a body 129 and a cladding 130. The cladding 130 has a thickness of .020 inch and consists of zirconium. The body 129 consists of 93½% uranium having the isotopic content found in nature, 5% zirconium, and 1½% niobium.

The core supporting structure 114 is constructed of stainless steel, and the length of the channels 117 is approximately 20 inches. The stems 120 of the fuel elements 118 and 119 have annular portions 131 for the first 24 inches, and rectangular portions 132 adjacent to the side plates 124. The diameter of the annular portions 131 is slightly smaller than the diameter of the channels 117 in the core supporting structure 114, namely approximately 3½ inches. The discharge fitting 126 is hollow and rectangular in shape with approximately the same dimensions as the rectangular portion 132 of the stem 120. A plurality of orifices 133 are provided in each discharge fitting 126, the rectangular end being open and forming a discharge port 134. The discharge fitting 126 is constructed of stainless steel and has a length of approximately 4 inches.

The fuel elements 119 include the same stems 120 and discharge fittings 126, but the regions between these structures are different from that of the fuel elements 118, as illustrated in Figures 6 and 7a. Side plates 136 constructed of zirconium having a thickness of ⅛ inch are secured between the stem 120 and the discharge fitting 126 of each fuel element 119 in a manner similar to the side plates 124 of the elements 118, but three aligned groups of five parallel spaced slots 137a, 137b and 137c are disposed in the confronting surfaces of the side plates 136 and confront each other. Five plates 138 containing uranium having the isotopic content found in nature are disposed between the first group of confronting slots 137a, this group being disposed adjacent to the stem 120 of the element 119. Immediately adjacent to the first group of aligned slots 137a, is the second group of slots 137b, and five plates 139 containing uranium highly enriched in the $U^{235}$ isotope. There are also five plates 138 containing uranium with the isotopic content found in nature disposed within the third group of confronting slots 137c in the side plates 136, this third group of slots 137c being disposed between the discharge fitting 126 of the fuel elements 119 and the second group of slots 137b. The plates 138 are each 8 inches in length, and the plates 139 containing uranium highly enriched in the $U^{235}$ isotope are each 32 inches in length, the plates 138 being separated from the plates 139 by a distance of approximately ⅛ inch.

The side plates 136 are constructed of zirconium and have a thickness of ⅛ inch, a width of 3⅞ inches, and a length of approximately 52 inches. The slots 137b in the second group are each approximately 1/16 inch in depth and have a width of approximately ⅛ inch. However, the slots 137a and 137c in the other two groups have a depth of approximately 1/16 inch and a width of approximately ¼ inch. Each of the plates 138 has a body 140 consisting of 93½% natural uranium, 5% zirconium, and 1½% niobium, and a cladding 141 which is 20 mils thick and consists of zirconium which is disposed about the body 140 and seals it from the water moderator. The plates 138 have a thickness of approximately ¼ inch, a length of 8 inches and a width of 3¾ inches. The plates 139 have a body 142 consisting of a uranium-zirconium alloy containing 5% uranium and 95% zirconium, the uranium being enriched in the $U^{235}$ isotope so that the $U^{235}$ isotope constitutes 93.5% of the uranium in the alloy, the body 142 being 80 mils thick, 3¾ inches wide, and 32 inches long in each of the plates 139. In addition, the plates 139 are provided with a cladding 143 of zirconium 10 mils thick. The plates 139 are spaced from each other by a distance of approximately ⅝ inch, and the plates 138 are spaced from each other by a distance of approximately 9/16 inch.

The channels 117 in the core supporting structure 114 are positioned to place the elements 116 in abutting relationship, so that the uranium containing plates 128, 138 and 139 are approximately equally spaced from each other and generally disposed on planes parallel to each other, as illustrated in Fig. 3. In the core 95 of the reactor 70, there are a total of 110 elements 118 and 38 elements 119 arranged to form an approximate foreshortened cylinder. The fuel elements 116 are disposed with their side plates 124 and 136 in parallel relationship in rows, the side plates 124 and 136 adjacent rows abutting each other, there being a total of 16 rows. As illustrated in Figure 3, the first row, designated 143a, contains two fuel elements 118, the second row 143b contains five fuel elements 118, the third row 143c contains eight elements 118, the fourth row 143d seven elements 118 and two elements 119 disposed centrally in the row, the next row 143e nine elements 118 and three elements 119, the three elements 119 being separated by elements 118 and disposed between four elements 118 at one end and three elements 118 at the other end of the row. The next row 143f contains eight elements 118 and four elements 119, the four elements 119 being separated by elements 118 and positioned between three elements 118 at one end of the row 143f and two elements 118 at the other end of the row 143f. The next row 143g contains seven elements 118 and five elements 119, the five elements 119 being positioned between elements 118, and two elements 118 being disposed at one end of the row 143g and one at the other end of the row. The following row 143h contains nine elements 118 and five elements 119, the five elements 119 being positioned between elements 118, and two elements 118 being disposed at one end of the row 143h and three elements 118 being disposed at the other end of the row 143h. Thus far, the left half of the core 95 (as viewed in Figure 3) has been described, and the right half of the core 95 is constructed in similar manner, as illustrated in Figure 3. There are a total of thirty-eight elements 119 and 110 elements 118.

The reactor is also provided with twelve neutron-absorbing safety control elements 104. The safety control elements 104 are disposed parallel with the axis of elongation of the pressure vessel 82 and are connected to the safety control rod drive mechanisms 106 by extension rods 144. The extension rods 144 extend through the channels 103 in the plug 102, the extension rods 144 being surrounded by sleeves 146 extending through the channels 103, the sleeves 146 being sealed to the secondary tank 105. The safety control elements 104 are slidably journaled within housings 147, best shown in Figure 10, which are secured within apertures 148 in the reactor core support structure 114. The housings 147 are rectangular in shape and provided with perforations 149. The housings 147 also extend above the core 95 a distance of approximately 3 feet. The housings 147 are constructed of zirconium and have walls approximately ¼ inch thick. The extension rods 144 are also constructed of zirconium and have a diameter of approximately ½ inch. The safety control elements 104 themselves are in the form of plates 150 of ¼ inch thickness provided with a stainless steel cladding 151. The safety control elements 104 measure approximately 3½ inches wide, ½ inch thick, and 4 feet long, the thickness of the stainless steel cladding 151 being 20 mils. The safety control elements 104 extend approximately 1 foot above the housings 147 when in the position of maximum reactivity, as illustrated in Figure 2.

Figure 1:
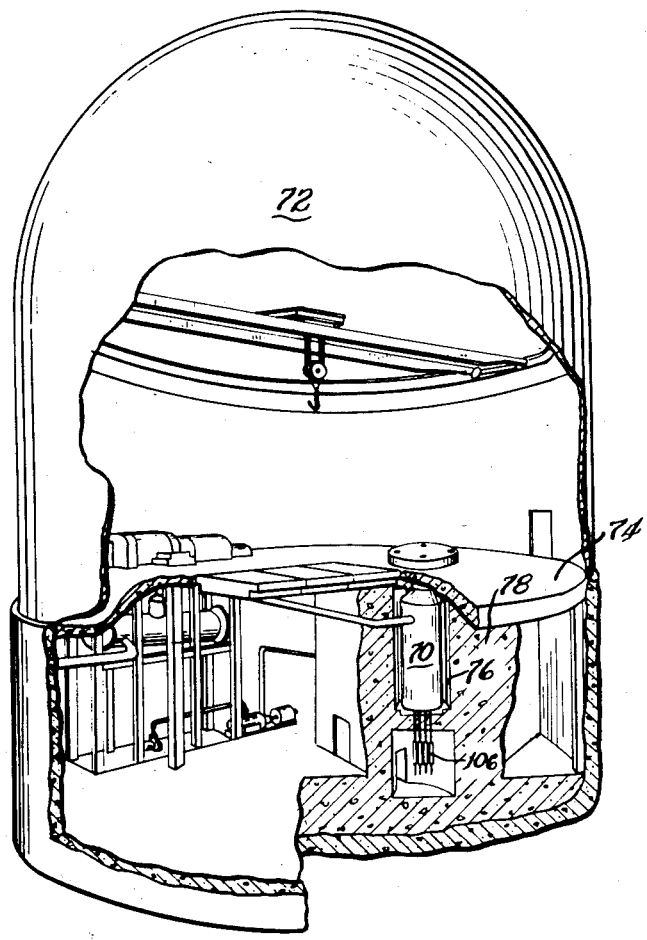
Figure 1 is an isometric view, partly cut away and in section, of a neutronic reactor constructed according to the teachings of the present invention.
Figure 9:
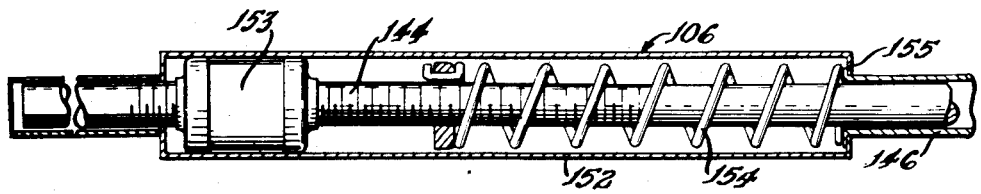
Figure 9 is a sectional view of one of the control drive mechanisms illustrated in Figures 1 and 2.
Figure 10:
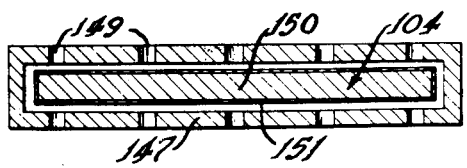
Figure 10 is a sectional view of one of the control elements illustrated in Figures 2 and 3.

One of the safety control rod drive mechanisms 106 is shown in detail in Fig. 9. The rod extension 144 extends through a housing 152 of the drive mechanism 106 and an electric motor 153 is mounted to the housing and has a rotor threadedly engaged with the extension rod 144. A spring 154 is also disposed within the housing 152 and has one end abutting the end 155 of the housing 152 and the other end attached to the extension rod 144. The extension rod 144 is not rotatable within the housing 152 or sleeve 146, so that operation of the motor 153 translates the extension shaft within the sleeve 146 and housing 152. In this manner, the spring 154 is compressed as the control element 104 is removed from the core 95 of the reactor. When the safety control element is to be reinserted into the core 95 of the reactor, the spring 154 supplies an additional rapid acceleration, in the present construction, an acceleration equal to 2 g.

As shown in Fig. 3, the first row 143a of fuel elements 116 contains no safety control elements 104, nor does the second row 143b, or third row 143c. The fourth row 143d, however, contains two safety control elements 104, these elements being spaced from the ends of the row 143d by three fuel elements 116. The next adjacent row 143e contains no safety control elements 104, nor does the next adjacent row 143f. However, the following row 143g contains four safety control elements 104, the outer two being disposed with three fuel elements 116 between them and the ends of the row 143g, and each of the other two safety control elements 104 being spaced by fuel element 118 and fuel element 119. The next row 143h again contains no safety control elements. This covers the left half of the core 95, and the right half is of similar construction, as illustrated in Figure 3.

The reactor described so far has been substantially the same as that described in the aforementioned Untermyer application. The invention relates to a particular control means and method which will now be described; first in general terms and then in detail.

In general the invention relates to control of a boiling water reactor by a soluble poison contained in the water. When the solution of the poison is dilute, the reactor is more reactive than when the solution is more concentrated due to absorption of neutrons by the poison. The relative dilution of the poison is controlled by control of the feed water to the reactor. An increase in the rate of feed water introduction dilutes the poison and a decrease in the rate of feed water introduction concentrates the poison. When the rate of feed water introduction is increased, the volume of water in the reactor increases and the upper level of the water is raised. A considerable portion of this poison is in a location where it has no substantial effect on reactivity of the reactor and the remaining poison which is so located that it will effect the reactivity of the reactor is more dilute than it was. Conversely, a decrease in the rate of feed water introduction causes the water level to fall concentrating the poison within the portion of the reactor where it has maximum effect.

Another method of reactivity control with a soluble poison involves the injection of the soluble poison into the reactor or removing the soluble poison from the reactor. The invention described above may be carried out separately or in conjunction with the injection of the soluble poison into the reactor.

A specific embodiment of the invention will now be described.

Figure 11 schematically illustrates the steam system for the reactor and includes a control system according to the present invention. The water level, designated 156, within the pressure vessel 82 is disposed normally about halfway between the entrance of pipes 155a and 155b into the pressure vessel 82. In this manner, a steam dome 157 is formed between the water level 156 and the neck 84 of the pressure vessel 82. The steam dome 157 functions to collect steam, form a cushion against pressure surges, and to delay the passage of steam from the reactor core for a period of time, thus permitting a portion of the water carried by the steam to return to the body of water within the pressure vessel 82.

The pressure vessel 82 is provided with an aperture 158 slightly below the neck 84 thereof (Fig. 2). A pipe 160 is connected from the aperture 158 through a valve 162 to a turbogenerator 164 which is connected to a condenser 166. The water condensate in the condenser 166 is pumped back into the pressure vessel 82 by a pump 168 through a pipe 169 and a valve 170. The water condensate re-enters the pressure vessel 82 through an aperture 171 and is conducted through a pipe 172 downwardly to a perforated distribution ring 173 which is disposed beneath the surface of the water 156 within the pressure vessel 82, and slightly above the tops of the fuel elements 116 in the core 95, as illustrated in Figure 2. The distribution ring 173 is disposed on a plane normal to the axis of elongation of the pressure vessel 82 and adjacent to the inner surface of the pressure vessel 82.

The condenser 166 is cooled by a flow of water from any convenient source. Excess condensate from the condenser 166 is stored temporarily in a surge tank 174 until such time as needed.

The pipe 160 is also connected beyond the valve 162 through a pipe 176 to an integrator 178. The pipe 160 beyond the junction with the pipe 176 passes through a device 180 restricting the flow of steam therethrough, said device being connected through a pipe 182 to the integrator 178. The integrator 178 is connected to a water-level indicator 184 which communicates through the pipes 155a and 155b with the interior of the pressure vessel 82. The function of the integrator 178 will be described hereinafter. The pipe 160 is connected beyond the device 180 through a pipe 186 and a valve 188 to the condenser 166, providing thereby a by-pass around the turbogenerator 164. The by-pass control valve 188 permits a portion, or all, of the steam generated by the reactor 70 to be directly connected to the condenser 166, thus by-passing the turbogenerator 164. In this manner, it is possible to operate the reactor without the turbine. The turbogenerator 164 is rated at approximately 5000 kilowatts electrical output having an inlet steam pressure of 550 to 575 pounds per square inch and an exhaust steam pressure of 1.22 pounds per square inch.

The integrator 178 is a conventional device used in steam-power generating plants for maintaining the pressure of a steam plant at a constant value even though a varying demand is placed on associated electrical generating equipment. The integrator 178 maintains the steam pressure at a constant value in response to pressure differences existing in the pipes 176 and 182. When the demand for steam slackens, the flow rate in line 160 is reduced and the difference in pressure between pipes 176 and 182 is reduced. Integrator 178 thereupon causes the reactivity of the reactor to be decreased thereby decreasing the amount of steam formed. Likewise an increased demand for steam results in the formation of an increased amount of steam. Integrator 178 also acts as a liquid level limit control. When level indicator 184 indicates that the water in the pressure vessel 82 has risen to the point where pipe 155a enters the pressure vessel, integrator 178 cuts off further supply of feed water. Conversely integrator 178 does not permit the liquid level to fall below pipe 155b. The pressure measuring device incorporated within the integrator 178 may be a conventional manometer flow meter as supplied by Fischer-Porter Co., or a pressure controller supplied by The Hays Corporation. Any one of the above devices may be used to control pneumatically or electrically the actuation of the valves 170 and 196. The water-level indicator 184 is also conventional and may be of the type known as "Levelimeter" supplied by said Fischer-Porter Co.

It is not necessary to employ any of the aforementioned pressure responsive devices. The operation may be entirely manual. An operator may regulate the rate of feed water returning to the pressure vessel 82 by observing a pressure gauge and actuating valve 170 to maintain the steam pressure at a constant value. Additional manual control may be exerted by regulating valve 196 to vary the concentration of neutron-absorbing material fed into the feed water at junction 198.

The integrator 178 controls the actuation of the valve 170 and 196 as indicated by broken lines. The soluble poison which according to the preferred embodiment of the invention is a solution of boric acid, is contained within a vessel 190. The boric acid solution is fed into the feed water returning to the reactor 70 by means of the pump 192, pipe 194, and valve 196. The boric acid concentrate mixes with the feed water at the junction 198. A certain amount of the boric acid in the water contained within the pressure vessel 82 is returned to the vessel 190 through a pipe 200, valve 202, an evaporator 204 and through the pipe 206 back to the vessel 190. The evaporator 204 has an element 208 connected to any convenient source providing thermal energy to provide heat for evaporation of the returned water solution of boric acid. The volume of the vessel 190 is about 5% that of the volume of the pressure vessel 82. About 12 grams of $B_2O_3$ are dissolved per 100 cc. of water at 100° C. in the vessel 190.

Assuming for the moment that the reactor 70 is operating at a constant level indicating an unvarying power demand, the rate of flow of the feed water from the condenser 166 to the vessel 82 will be such as to maintain the water level 156 at approximately the level indicated in Figure 11. During this constant operation, a certain amount of boric acid-water solution is withdrawn by the pump 202 from the pressure vessel 82 and the boric acid is concentrated in the evaporator 204, and then stored in the vessel 190. At the same time, a certain amount of boric acid concentrate is withdrawn from the vessel 190 by the pump 192, as controlled by the valve 196, and mixed with the feed water returning into the reactor pressure vessel 82. Should a change occur in the power demand, for example a larger load is placed on the turbogenerator 164, the integrator 178 will react to adjust the steam output to match the load demand. The integrator 178 detects the change in the power demand and reacts to increase the power produced in the reactor 70 by actuating the control valve 170 to increase the rate of flow of the feed water returning to the pressure vessel 82 so that the boric acid already contained in said vessel is diluted thereby increasing neutronic reactivity in the core 95. At the same time, the valve 196 is operated in such manner as to decrease the amount of boric acid concentrate fed into the feed water at the junction 198. It is to be understood, that although there are two controls simultaneously operated by the integrator 178, said controls being the control valves 170 and 196, it is sufficient to operate only the valve 170 at an increased rate to increase the amount of feed water pumped back into the pressure vessel 82.

Should a change occur in the power demand in the opposite direction, that is, the load on the turbogenerator 164 is decreased, the integrator 178 senses this change in power demand and actuates the control valve 170 to adjust the ratio of the feed water flow to steam flow in a downward direction by closing down the feed water flow control valve 170. This action concentrates the liquid poison in the core volume. In addition to the control of the valve 170, the valve 196 operates to permit a larger flow of boric acid concentrate into the feed water at the junction 198. Although a disclosure has been made utilizing boric acid as the poison to be mixed with the feed water, it is understood that other materials having a relatively high neutron-capture cross section can be utilized in solution or dispersion.

A certain minimum concentration of boric acid must always be maintained in the water in the pressure vessel 82. The percent of $\Delta k$ tied up in the soluble boric acid is quite variable but a certain maximum of concentration of boric acid is desirable. This should be such that under all conditions, with the reactor disclosed herein, there is always more reactivity in steam voids than in the borated water on a volume per volume basis. The more reactivity held on by the soluble poison, the more rapid will be power changes with water level changes.

Table I summarizes some of the principal design characteristics of the reactor disclosed above:

*Table I*

| | |
|---|---|
| Pressure vessel | 6 ft. diameter—25 ft. high. |
| Pressure in pressure vessel | 600 lbs. per sq. in. |
| Moderator | $H_2O$. |
| Volume ratio of $H_2O/U$ | 2.5 :1. |
| Core diameter | 4½ ft. |
| Core height | 4 ft. |
| Maximum fuel element surface temperature | 515° F. |
| Maximum fuel element core temperature | 610° F. |

*Table I—Continued*

| | |
|---|---|
| Reactor power | 20,000 kw. |
| Generating capacity | 5,000 kw. |
| Efficiency | 25 percent. |
| Core volume | 1,800 liters total. |
| Power density, average | 11 kw./liter of core—18 kw./liter of coolant. |
| Power density, maximum | 24 kw./liter of core—39.5 kw./liter of coolant. |
| Saturated steam flow | 16.8 lb./sec. |
| Feed water flow | 120 gallons per minute. |
| Condensate return temperature | 110° F. |
| Average steam voids in exiting coolant | 20 percent. |
| Fraction of height in boiling | 65 percent. |
| Mean steam voids for core | 6.5 percent. |
| Maximum heat flux | 150,000 B.t.u./(hr.)/(sq. ft.). |
| Internal circulation ratio, i.e., the ratio of water mass flow to steam mass flow in the reactor | 140 :1. |
| Fuel elements 118 (93.5% natural uranium + 5% Zr + 1½% Nb) | Approximately ⅜ in. plates, 20 mil zirconium clad, 4 ft. high, ⅝ in. water passage. |
| Fuel elements 119 | Natural uranium ends 8 inch long. |
| 30 assemblies in central zone of reactor | Enriched zone 32 in. long: Zr-$U^{235}$ alloy plates; zirconium clad—10 mils; body—80 mils. 5% $U^{235}$, 95% Zr. Water passage—⅝ in. |
| Critical mass—operating plus 2 months burnup of enriched fuel | 10 kgs. $U^{235}$ and 6 tons natural uranium. |
| Operating cycle: | |
|   Enriched fuel | 40% burnup—2 years. |
|   Natural fuel | 10,000 mwd./ton. |
| Power distribution: | |
|   Enriched uranium power | 25%. |
|   Natural uranium power | 75%. |
| Safety control | 12 boron-steel safety control rods in core. Burnup—by adding $U^{235}$ fuel. |
| $\Delta k$ in steam voids (operating) | 0.5%. |
| $\Delta k$ in temperature | 21%. |
| $\Delta k$ in 20% steam voids | 4.9% hot, or 0.7% cold. |
| $\Delta k$ in 50% steam voids | 8.5% hot, or 6.3% cold. |
| Expansion of uranium as a result of an excursion which expels water and increases resonance absorption prior to fuel melting | 0.17% $k$. |
| Effect of withdrawing one safety control rod | 1% $k$. |
| Effect of adding one enriched fuel rod | 0.4% $k$ average or 1.0% maximum. |
| Prompt neutron lifetime | $5 \times 10^{-5}$ sec. |
| Radial flux, i.e., the ratio of the maximum thermal neutron flux to the average thermal neutron flux in a horizontal plane | 2.2. |
| Axial flux, i.e., the ratio of the maximum thermal neutron flux to the average thermal neutron flux along the central axis of the reactor | 1.43. |
| Neutron flux (average) | $10^{13}$ n/cm.²/sec. |
| Poison concentrate: $B_2O_3$ | 12 grams/100 cc. at 100° C. |

The fuel elements 116 must be removed from the reactor from time to time. The reactor is designed to require replacement of the fuel elements 118, which contain uranium with the natural isotopic content, after 10,000 megawatt days per ton of uranium, or in other words, approximately every ten years. The fuel elements 119, which contain enriched uranium sections, will require replacement on an average of every two years. Also, some enriched uranium elements 119 will be required to replace fuel elements 118 after prolonged periods of operation in order to maintain the desired reactivity as a result of losses in reactivity which occur through long term operation.

Fuel elements 118 and 119 are removed through the neck 84 of the pressure vessel 82. Before the fuel elements 116 are to be removed, the reactor is shut down, and the entire pressure vessel 82 flooded with water, including the steam dome 157. The water in the steam dome 157 is thus used as a shield when the removable slab 113, cover 88, and plug 111 are removed. The fuel elements 116 are then individually lifted through the neck 84 of the pressure vessel 82 and placed within a shielded container, or coffin, as is conventional, for removal. A time lapse of approximately 3 hours is required between reactor shutdown and unloading operations with the particular construction to permit the radioactivity of the fuel elements 116 to decay sufficiently for removal from the pressure vessel 82. New fuel elements 118 and 119 are lowered into the reactor through the neck 84 and placed in the supporting structure 114.

The heat generated within the fuel elements 118 and 119 is removed by the natural circulation caused by the boiling of the coolant within the fuel elements 118 and 119. The coolant water enters the reactor at a point above the reactor core 95 through the distribution ring 173. This water then flows downwardly, principally along the walls of the pressure vessel 82, to enter the fuel elements 116 at their lower extremity. The loss in density of the water in the fuel elements 116 as the water is heated and transformed to steam, causes the water to flow upwardly through the fuel elements 116. At full power, for each pound of steam formed approximately 140 pounds of water are circulated as a result of convection in this manner.

The water entering the fuel elements 116 is always slightly subcooled because the feed water is relatively cool. At the 20,000 kilowatt heat design condition, subcooling is approximately 3° F. Actual boiling does not occur until the cooling water has traversed approximately 35% of the height of the fuel elements 116. Steam formation, and thus a reduction in moderator density, occurs all along the remaining length of the fuel elements 116. Approximately 20% of the volume is steam as the steam-water combination exits from the fuel elements 116, and the average steam void content of the entire reactor core 95 is approximately 6.5%. At the full power of 20,000 kilowatts heat, the maximum power density within the hottest fuel element 116 is 39.5 kilowatts per liter of cooling channel volume.

The above-mentioned maximum power density corresponds to a thermal heat flux of 150,000 B.t.u./hr./ft.$^2$. This heat rate produces a fuel plate surface temperature of about 515° F., and a maximum temperature within a fuel plate of 610° F.

Figure 12 illustrates the effect upon reactivity of voids in the water within the reactor core 95, the percentage of void being given relative to the volume of the reactor core 95. The operating point is indicated on the curve to illustrate that a change in voids will inversely affect the reactivity of the reactor. It is to be noted that this curve holds true and is repeatable only for a reactor at a boiling temperature prior to initiation of the chain reaction. If the reactor is brought to boil from a cold condition, a given percentage of voids will have a smaller effect on reactivity than that percentage of void will have after the reactor obtains thermal equilibrium.

The changes in the reactivity associated with reactor operation are summarized as follows:

*Table II*

| | Reactivity change in percent k |
|---|---|
| Temperature effects, cold to hot | 2.1 |
| Xenon and samarium, at equilibrium percentages | 2.8 |
| 6% operating void | 0.5 |
| Burnup allowance | 0.4 |
| Total | 5.8 |

All of the reactivity changes listed above are negative reactivity changes with an increase in the items mentioned.

As the reactor power is increased, the percentage of voids average throughout the reactor core is also increased. The following table assumes the operating point to be 6.5% average voids which occur at a power level of 20,000 kilowatts of heat, which is the design point in the particular construction. The overload ratio appearing in the table is the ratio of the power under different conditions to that of the operating design point.

*Table III*

| Overload ratio: | Mean voids in percent |
|---|---|
| 1.0 | 6.5 |
| 2.0 | 12.7 |
| 3.0 | 17.0 |
| 4.0 | 20.5 |

The reactor disclosed above is brought into operation by withdrawal of the safety control rods from the reactor core (the safety control rods are raised above the core), just as in the operation of other types of reactors, such as that disclosed in the Patent No. 2,708,656 of Fermi and Szilard entitled "Nuclear Reactors," issued May 17, 1955. The boric-acid-water solution within the pressure vessel, however, is preferably first brought to a boiling condition by external means before the safety control rods are withdrawn from the reactor, since the changes in reactivity due to temperature changes in bringing the reactor to the boiling condition need not then be experienced after start-up and a larger amount of reactivity will be dissipated in bubbles. Most of the safety control rods are withdrawn and the amount of boric acid in the water solution is increased to compensate for their effect on reactivity. Thereafter, the concentration of boric acid in the water is adjusted to obtain a specific reactivity level. Once the safety control rods are withdrawn and the concentration of boric acid is adjusted, it is not necessary to continuously regulate the safety control rods to prevent a reactor runaway, as is true in the nonboiling operation of reactors. Further, the power level to which the reactor will rise upon start-up is merely selected by adjusting the poison concentration within the reactor, since under a given set of conditions the amount of excess reactivity introduced into the reactor will determine its ultimate power level. The neutronic chain reaction increases in response to the insertion of excess reactivity into the reactor, and as a result the temperature of the coolant within the fuel elements 116 increases, forming an increase in the quantity of steam exiting from the fuel elements. The formation of steam reduces the density of the water within the reactor and increases the resonance absorption of neutrons in the $U^{238}$ present in the natural uranium, and to a lesser extent increases leakage from the reactor, and as a result lowers the reactivity until the entire reactivity increment which was inserted into the reactor by the change in poison concentration has been nullified. The reactor will then operate at a power level fluctuating about the level thus achieved, this power level fluctuation being due to short term reactivity changes within the reactor.

The inventor has found that up to 10% $K_{eff}$ can be dissipated in bubble formation and still maintain control of the reactor. However, with large amounts of reactivity dissipated in bubbles, the power level of the reactor tends to fluctuate over wide ranges. The inventor has found that the best operating range is with 0.5 to 4% $K_{eff}$ dissipated in steam bubbles, since under these conditions substantial amounts of power are delivered from the reactor at a relatively constant level.

In the present construction, the neutronic reactor achieves criticality, before use and the build-up of fission fragments, with the 8 peripheral safety control elements 104 entirely removed from the reactor and the 4 safety control elements 104 disposed about the axis approximately near the top of the core 95 of the reactor, these four safety control elements 104 being clustered about the vertical central axis of the core 95.

As previously stated, the invention may be practiced with a heavy water ($D_2O$) reactor which utilizes natural uranium for fuel, inherent safety being achieved principally by absorption of neutrons of resonant energy in the $U^{238}$ content of the uranium fuel. A heavy water moderated reactor may readily be constructed in relatively large sizes, and therefore inherent safety may not be achieved in all heavy water reactors as a result of increased leakage from the reactor with the formation of steam bubbles.

While there has been described what is at present considered to be the preferred embodiment of the invention, it will be understood that various modifications may be made herein and it is intended in the appended claim to cover all such modifications as found within the true spirit and scope of the invention.

What is claimed is:

The method of controlling reactivity in a direct-cycle boiling-water neutronic reactor wherein the steam developed in the reactor operates a turbogenerator and the spent steam therefrom is condensed and returned to the reactor, said neutronic reactor including a pressure vessel containing fuel elements forming the reactor core, said pressure vessel being filled with light water to a level above the top of the reactor core but not reaching the top of the pressure vessel, said method comprising maintaining boric acid in the water in the pressure vessel and controlling the amount of boric acid within the reactor core by continuously removing a portion of the water containing boric acid from the reactor core, concentrating the boric acid by evaporating the water therefrom, and returning a controlled amount of the concentrated acid to the reactor core and simultaneously controlling the water level in the pressure vessel by varying the rate of condensate return to the reactor whereby an increase in the rate of condensate return raises the water level in the pressure vessel thereby removing a part of the boric acid from the reactor core and a decrease in the rate of condensate return lowers the water level in the pressure vessel thereby concentrating the boric acid within the reactor core.

References Cited in the file of this patent

Proceedings of the International Conference on the Peaceful Use of Atomic Energy, August 8–20, 1955, United Nations, New York, vol. 3, pages 252, 256, 257.

Breden et al.: ANL–5244 (Del 2), USAEC report dated November 1955, declassified March 18, 1957; pages 23, 29, 41.

The Reactor Handbook, vol. 2, published by USAEC 1955; p. 106.

Nucleonics, vol. 14 (No. 4, April 1956) pp. 106, 108, 109 (No. 7, July 1956), pp. 42–45.

Nuclear Science and Engineering, vol. 1 (No. 5, October 1956), pp. 423–425, 434–436 (article by Zinn et al.).